(12) United States Patent
Wada et al.

(10) Patent No.: US 6,666,587 B2
(45) Date of Patent: Dec. 23, 2003

(54) METHOD FOR MANUFACTURING OPTICAL DEVICE AND OPTICAL DEVICE

(75) Inventors: Tetsuro Wada, Tokyo (JP); Toshihiro Mikami, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 339 days.

(21) Appl. No.: 09/811,455

(22) Filed: Mar. 20, 2001

(65) Prior Publication Data

US 2001/0051025 A1 Dec. 13, 2001

(30) Foreign Application Priority Data

Mar. 21, 2000 (JP) ........................ 2000-078838
Feb. 19, 2001 (JP) ........................ 2001-041835

(51) Int. Cl.[7] .................... G02B 6/36; G02B 6/42
(52) U.S. Cl. ................. 385/78; 385/88; 385/91; 385/85
(58) Field of Search ................ 385/78, 84–86, 385/88, 91, 92, 80; 427/163.2

(56) References Cited

U.S. PATENT DOCUMENTS

| | | | |
|---|---|---|---|
| 4,611,884 A | * 9/1986 | Roberts | 385/44 |
| 4,702,556 A | * 10/1987 | Ishii et al. | 385/91 |
| 4,805,976 A | * 2/1989 | Wilkening et al. | 385/84 |
| 4,997,252 A | * 3/1991 | Sugawara et al. | 385/92 |
| 5,412,748 A | * 5/1995 | Furuyama et al. | 385/92 |
| 5,764,840 A | * 6/1998 | Wach | 385/123 |
| 5,861,637 A | * 1/1999 | Oishi | 385/92 |

FOREIGN PATENT DOCUMENTS

| | | | |
|---|---|---|---|
| JP | 62-192707 | 8/1987 | |
| JP | 63-228110 | 9/1988 | |
| JP | 02-093414 | * 4/1990 | G02B/6/42 |

* cited by examiner

*Primary Examiner*—David V. Bruce
*Assistant Examiner*—Krystyna Suchecki
(74) *Attorney, Agent, or Firm*—Oblon, Spivak. McClelland, Maier & Neustadt, P.C.

(57) ABSTRACT

In an optical device manufacturing method according to the present invention, a metal film is formed on a side surface of a bare fiber, a film is formed on an end face of the bare fiber, and, thereafter, the bare fiber is inserted into a ferrule until the end face of the bare fiber on which the film was formed is protruded from an end face of the ferrule, and then, the bare fiber is secured to the ferrule. In an optical device according to the present invention, a bare fiber having a side surface on which a metal film was formed is inserted into and secured to a ferrule, and an end face of the bare fiber is protruded from an end face of the ferrule, and a distance L between the end faces satisfies a relationship $L<4 \times d$ (outer diameter of the bare fiber), and a film is formed on the end face of the bare fiber.

16 Claims, 7 Drawing Sheets

METHOD FOR MANUFACTURING OPTICAL DEVICE AND OPTICAL DEVICE

BACKGROUND OF THE INVENTION

1. Field of the Invention

The present invention relates to an optical device and a method for manufacturing such an optical device.

2. Description of the Related Art

Figure 8:
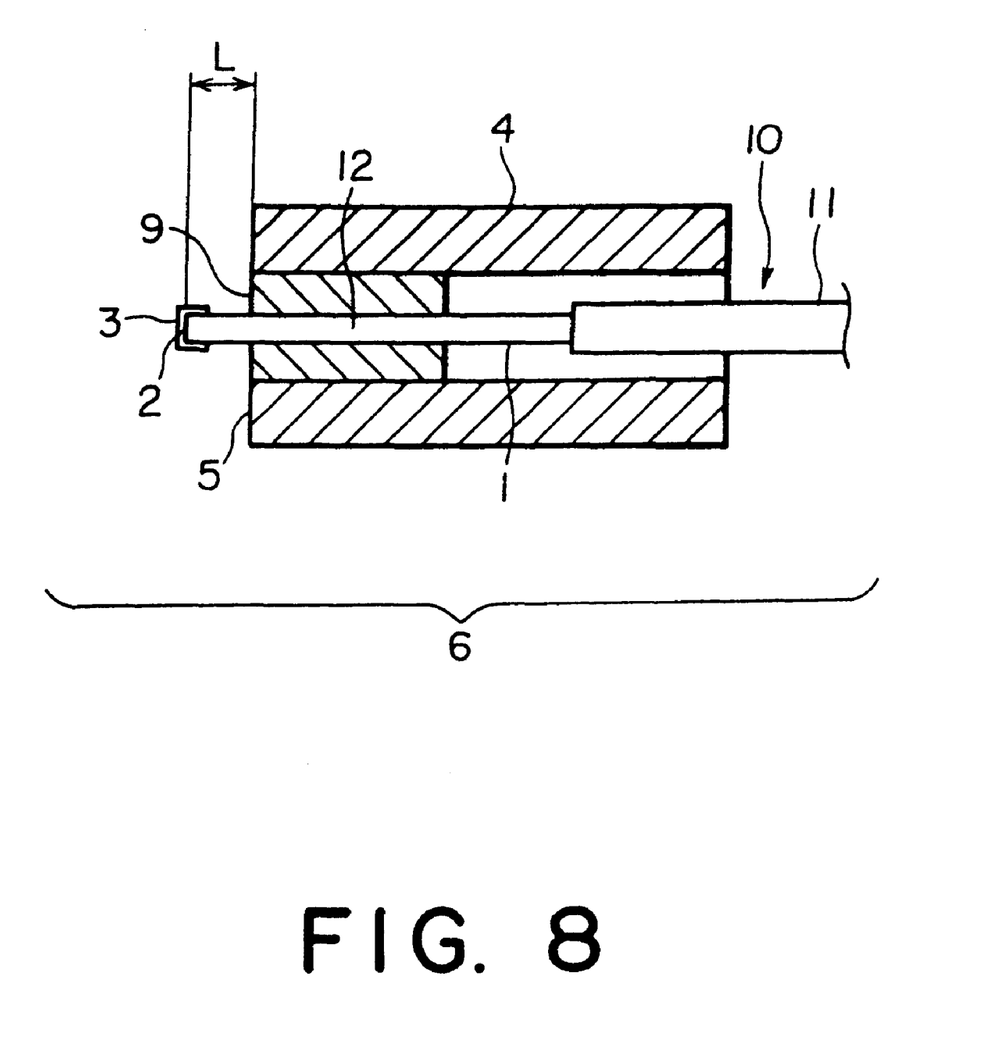
FIG. 8 is an explanatory sectional view showing another example of an optical device.

Among optical devices, there is an optical device as shown in FIG. 8. In this optical device, an end face 2 of a bare fiber 1 inserted into and secured to a ferrule 4 is protruded outwardly from an end face 5 of the ferrule 4, and an anti-reflection film or other film 3 is coated on the protruded end face 2 of the bare fiber 1.

A optical device as shown in FIG. 8 is manufactured in the following manner. A metal film is formed on a side surface 12 of one longitudinal end portion of the bare fiber 1. Then, the bare fiber 1 having the side surface 12 on which the metal film was formed is inserted into the ferrule 4 so that the end face 2 of the bare fiber 1 is protruded outwardly from the end face 5 of the ferrule 4. Thereafter, the bare fiber 1 inserted in the ferrule 4 is secured to the ferrule 4 by soldering up to the side surface 12 on which the metal film was formed. Then, the bare fiber 1 with the ferrule 4 is set in a vacuum chamber of a film forming device, where an anti-reflection film or other film 1 is formed on the end face 2 of the bare fiber 1 protruded from the end face 5 of the ferrule 4 by depositing evaporation atoms or molecules of film forming material.

SUMMARY OF THE INVENTION

In an optical device manufacturing method according to the present invention, a metal film is formed on a side surface of a bare fiber and a film is formed on an end face of the bare fiber, and, thereafter, the bare fiber is inserted into a ferrule in such a manner that the end face on which the film was formed is protruded from an end face of the ferrule, and the bare fiber is secured to the ferrule.

In an optical device according to the present invention, in which a bare fiber having a side surface on which a metal film was formed is inserted into and secured to a ferrule, an end face of the bare fiber is protruded outwardly from an end face of the ferrule, and, when it is assumed that a distance between the end faces is L and an outer diameter of the bare fiber having the side surface on which the metal film was formed is d, a relationship L<4×d is satisfied, and a film is formed on the end face of the bare fiber.

BEST MODES FOR CARRYING OUT THE PRESENT INVENTION

First Embodiment

Figure 3B:
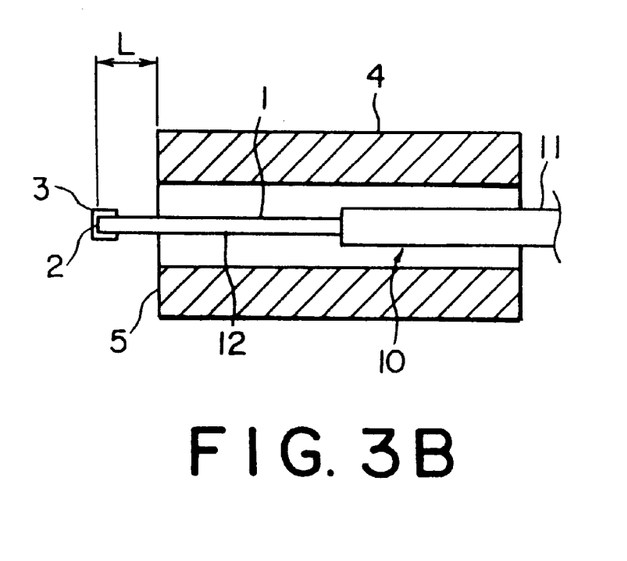
FIG. 3B is an explanatory sectional view showing a condition that the bare fiber after film forming was inserted into the ferrule.
Figure 4:
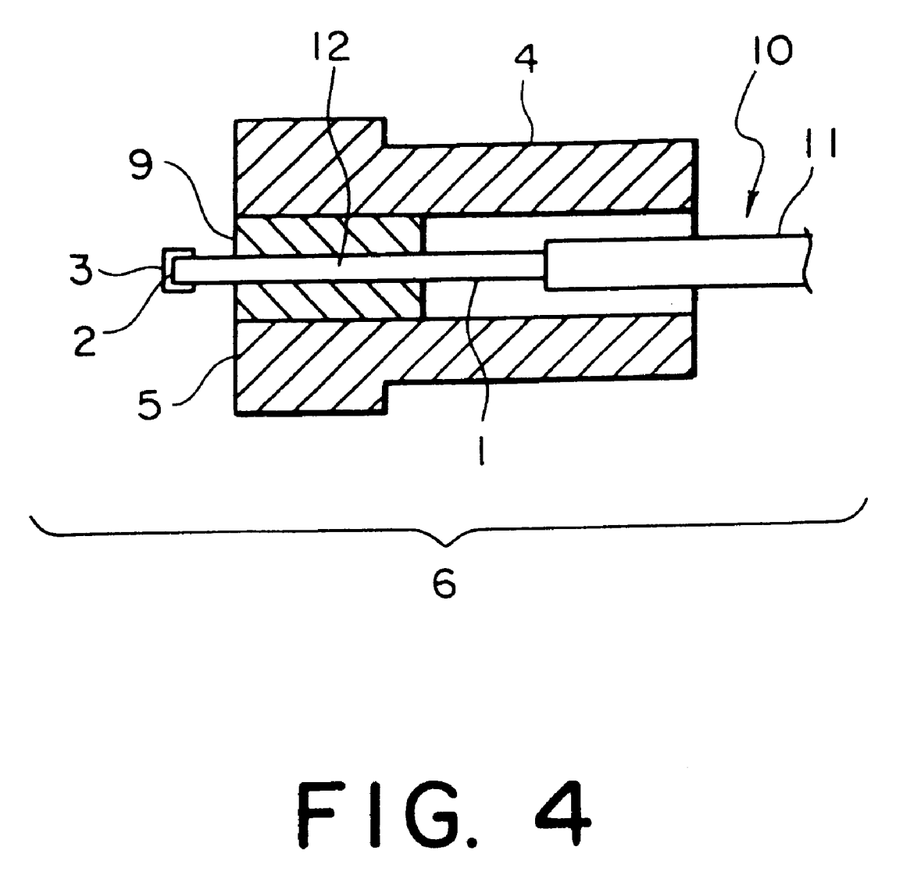
FIG. 4 is an explanatory sectional view showing an example of an optical device.

A first embodiment of an optical device manufacturing method according to the present invention will now be explained. This method is a method for manufacturing the optical device (generally called as "lensed fiber") and, in this method, as shown in FIGS. 3B and 4, after an anti-reflection film (AR film) 3 is previously formed on an end face 2 of a bare fiber 1, the bare fiber 1 is inserted into and secured to a ferrule 4.

Figure 1:
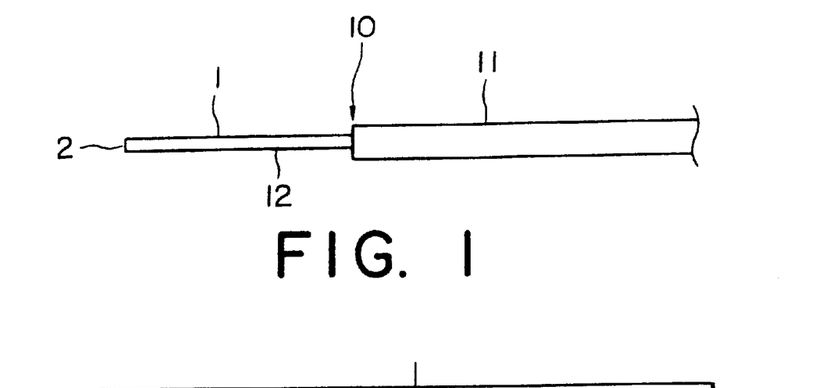
FIG. 1 is an explanatory view showing a bare fiber before film forming.
Figure 5A:
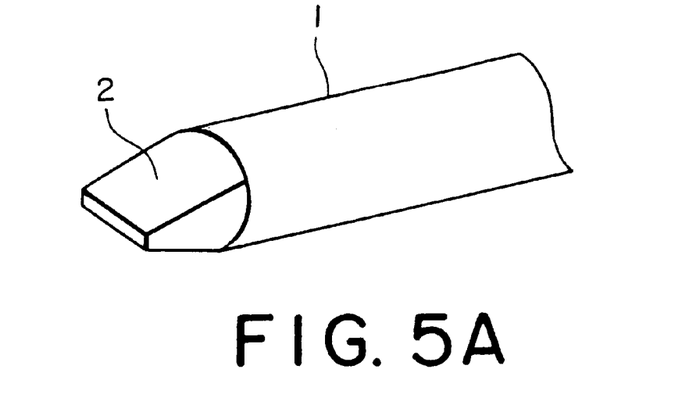
FIG. 5A is an explanatory view showing an end face of a bare fiber formed as a wedge.
Figure 5B:
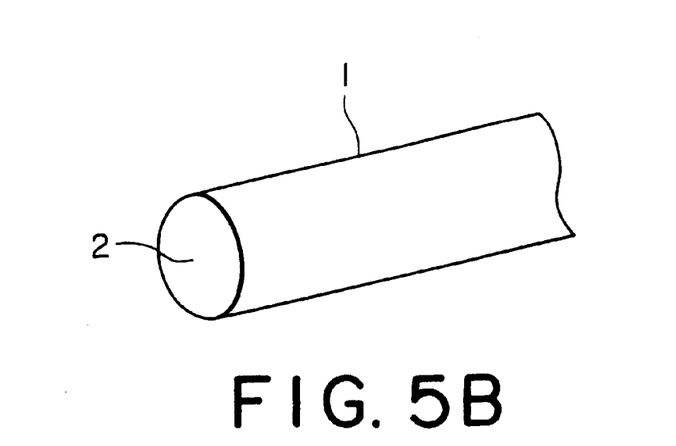
FIG. 5B is an explanatory view showing a mirror-finished end face of a bare fiber.
Figure 5C:
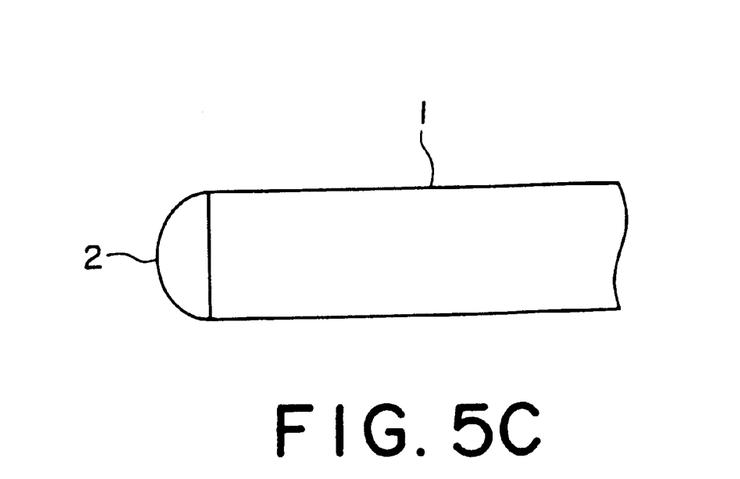
FIG. 5C is an explanatory view showing an end face of a bare fiber formed as a curved surface.

More specifically, as shown in FIG. 1, a resin coating (outer coating) 11 is removed from on longitudinal end portion of an optical fiber 10 to expose a bare fiber 1. A metal film is formed on a side surface 12 of the longitudinal end portion of the bare fiber 1 by plating, deposition, sputtering or the like. After the formation of the metal film is completed, the end face of the bare fiber 1 is worked to be formed as a wedge as shown in FIG. 5A or to obtain a mirror-finished flat surface as shown in FIG. 5B or to obtain a curved surface as shown in FIG. 5C.

Figure 2:
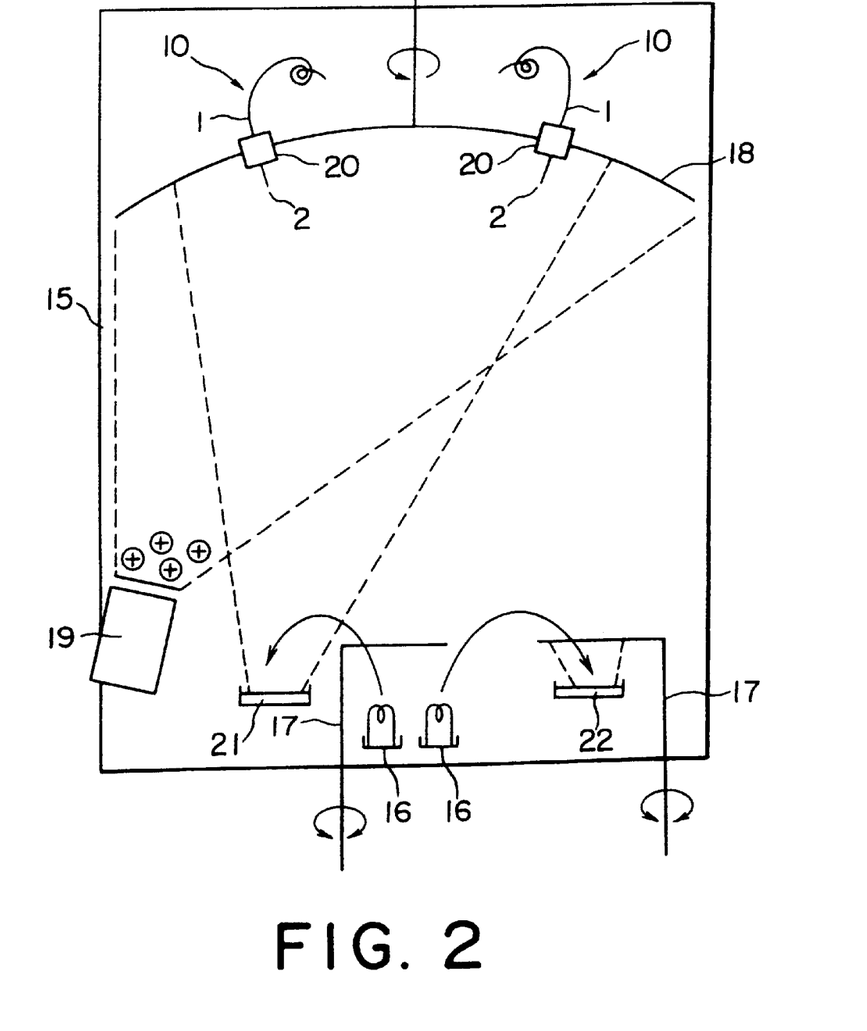
FIG. 2 is an explanatory view showing an example of a vacuum chamber of a film forming apparatus.

Thereafter, as shown in FIG. 2, the bare fibers 1 are set in a film forming device in such a manner that the end faces 2 of the bare fibers 1 are exposed within a vacuum chamber 15 of the film forming apparatus. Then, an anti-reflection film 3 (FIGS. 3A and 3B) obtained by alternately lamination silica ($SiO_2$) and tantalum oxide ($Ta_2O_5$) is formed on each end face 2. More concretely, the bare fibers 1 are set on a rotary dome 18 provided within the vacuum chamber 15 via respective holders 20, and film forming material ($SiO_2$ or $Ta_2O_5$) 21 is illuminated by an electronic beam emitted from one of electron beam source 16 to fuse the film forming material 21 while rotating the rotary dome 18, with the result that atoms or molecules of such material are evaporated, thereby forming $SiO_2$ films or $Ta_2O_5$ films having predetermined thickness on the end faces 2 of the bare fibers 1. Thereafter, the film forming material 21 is covered by a shutter 17 (shutter 17 is closed). Then, film forming material ($Ta_2O_5$ or $SiO_2$) 22 is illuminated by an electronic beam emitted from the other electron beam source 16 to fuse the film forming material 22, with the result that atoms or molecules of such material are evaporated, thereby forming $Ta_2O_5$ films or $SiO_2$ films having predetermined thickness on the end faces 2 of the bare fibers 1. Thereafter, the film forming material 22 is covered by the other shutter 17 (shutter 17 is closed). By repeating such operations, the $SiO_2$ films or $Ta_2O_5$ films having the predetermined thickness are alternately formed on each end face 2 of the bare fiber 1. Incidentally, an ion assist device capable of illuminating $O_2$ active molecules onto the end faces 2 of the bare fibers 1 or accelerating $O_2$ active molecules is provided within the vacuum chamber 15. When the $O_2$ active molecules are illuminated onto the end faces 2 of the bare fibers 1 by such a device 19, energy is given to the atoms or molecules of the material to be deposited onto the end faces 2, thereby forming denser films. Incidentally, active molecules to be illuminated may be Ar active molecules, He active molecules, $H_2$ active molecules, $CO_2$ active molecules, $H_2O$ active molecules or $N_2$ active molecules.

Figure 3A:
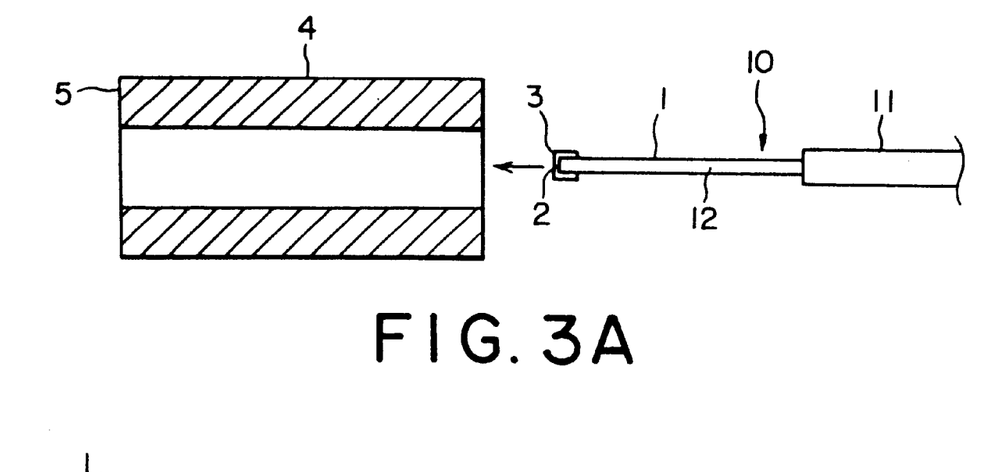
FIG. 3A is an explanatory sectional view showing a step for inserting a bare fiber after film forming into a ferrule.

Then, the bare fiber 1 having the end face 2 on which the anti-reflection film 3 was formed is inserted into the ferrule 4 (FIG. 3A). Thereafter, the end face 2 on which the anti-reflection film was formed is protruded outwardly from the end face 5 of the ferrule 4 (FIG. 3B). In this condition, the bare fiber 1 is soldered to the ferrule 4.

In the conventional method in which, after the bare fiber 1 is previously inserted into and secured to the ferrule 4, evaporation atoms or molecules of $SiO_2$ or $Ta_2O_5$ are deposited on the end face 2 of the bare fiber 1, if a distance (protruded length L in FIG. 3B) between the end face 5 of the ferrule 4 and the end face 2 of the bare fiber 1 protruded from the ferrule is short, the evaporation atoms or molecules to be deposited on the end face of the bare fiber 1 will strike against evaporation atoms or molecules rebounded from the end face 5 of the ferrule 4, thereby causing inconvenience that evaporation atoms or molecules will not be adequately deposited on the end face 2 of the bare fiber 1. However, in the optical device manufacturing method according to the present invention in which the anti-reflection film is formed on the end face 2 of the bare fiber 1 before the bare fiber 1 is inserted into and secured to the ferrule 4, there is no possibility for causing such inconvenience, and the anti-reflection film having the desired thickness can be formed, and, thus, an optical device having expected optical property can be obtained. Incidentally, when a theoretical calculation value of a reflection reducing amount is 40 dB, as a result of tests in which reflectivity and reflection reducing amount are measured regarding light in a band of 980 nm of an optical device manufactured by the optical device manufacturing method of the present invention, it was found that the reflectivity is smaller than 0.015% and the reflection reducing amount is 38 dB. On the other hand, as a result of similar tests effected regarding the optical device manufactured by the conventional manufacturing method, it was found that the reflection reducing amount is 30 dB. Incidentally, this reflection reducing amount is based on the reflectivity of 0%.

Figure 6:
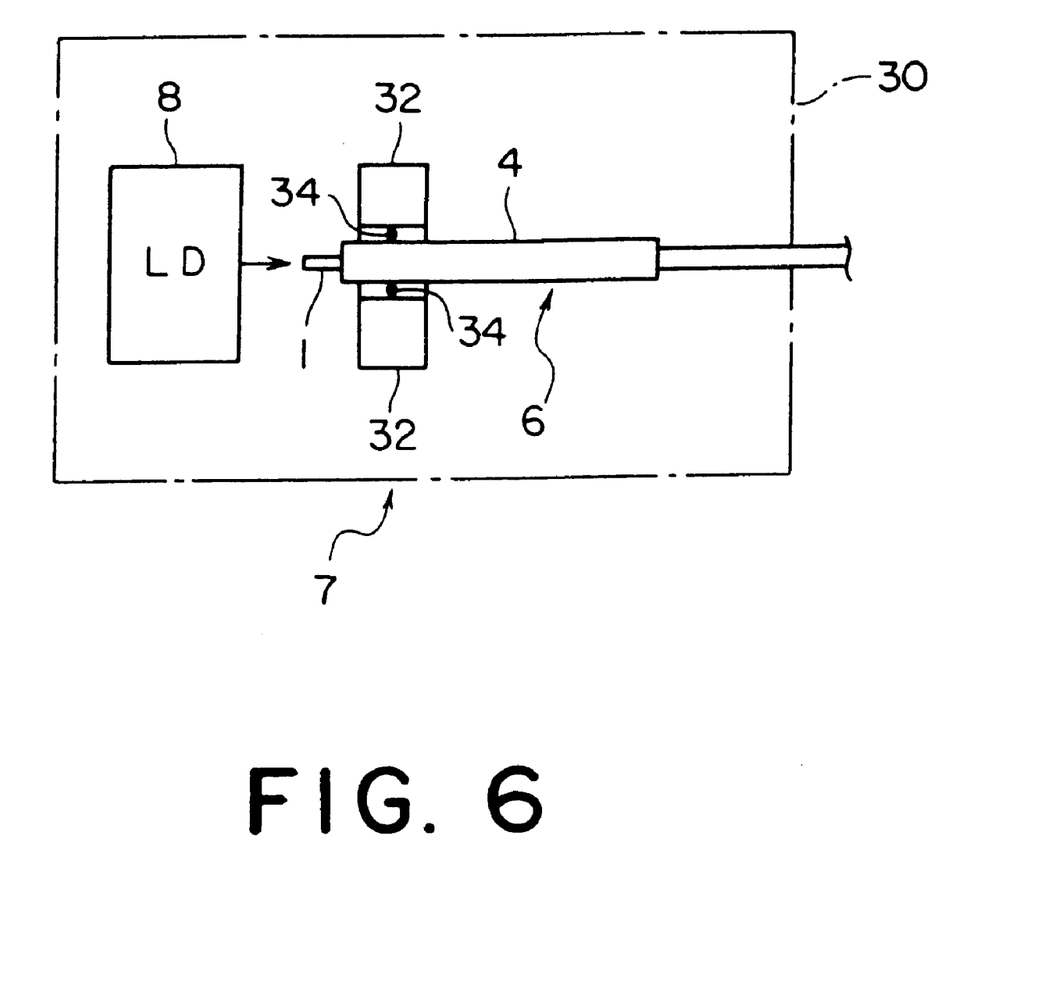
FIG. 6 is an explanatory view showing an optical module comprised of an optical device and an LD.
Figure 7A:
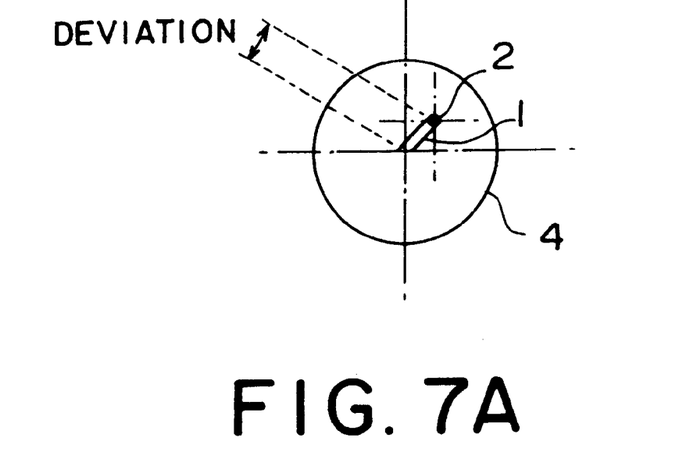
FIG. 7A is an end view showing a condition that a center of a bare fiber protruded from an end of a ferrule is deviated from a center of the ferrule.
Figure 7B:
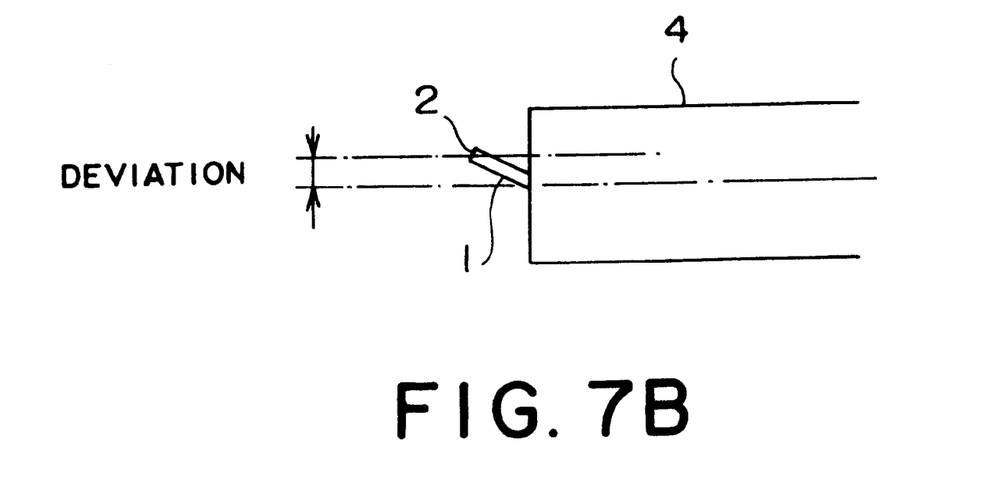
FIG. 7B is a side view showing the condition that the center of the bare fiber protruded from the end of the ferrule is deviated from the center of the ferrule.

Further, in order to resolve the above-mentioned inconvenience, there has been proposed a method in which the protruded length L is increased (for example, 1.0 mm or more). However, if the protruded length is too long, as shown in FIGS. 7A and 7B, a deviation amount between the center of the bare fiber 1 protruded from the end face 5 of the ferrule 4 and the center of the ferrule 4 is increased, thereby affecting a bad influence upon formation of the module. More specifically, in order to manufacture an optical module as shown in FIG. 6 by combining an optical device 6 and an LD 8, optical alignment between the bare fiber 1 and the LD 8 must be performed, and such optical alignment is effected by aligning the center of the ferrule 4 with the center of the LD 8. Accordingly, if the center of the bare fiber 1 protruded from the end face 5 of the ferrule 4 and the center of the ferrule are deviated by ±0.3 μm with respect to a direction parallel to a light emitting plane of the LD 8, coupling efficiency (efficiency for directing laser light emitted from the LD 8 into the bare fiber 1) is changed by ±5%. Incidentally, an allowable changing amount is about ±2%. According to the optical device manufacturing method of the present invention, since the protruded length L must not be lengthened too much, such inconvenience does not occur.

According to the Inventors' investigation, so long as the protruded length L and an outer diameter d of the bare fiber 1 having a side surface on which the metal film was formed satisfy a relationship L<4×d, optical alignment between the LD 8 and the bare fiber 1 as shown in FIG. 6 can easily be effected. Thus, in the present invention, regarding a bare fiber 1 having the outer diameter d of 0.125 mm, the protruded amount L is selected to be not greater than 0.5 mm (here, 0.4 mm), and the side surface 12 (on which the metal film was formed) of the bare fiber 1 is soldered to the ferrule 4 while maintaining the protruded length L. In this way, an optical device having desired optical property and permitting easy formation of module can be obtained. FIG. 6 shows an optical module in which the end face of the bare fiber 1 of such an optical device is aligned with the LD 8 and the ferrule 4 is weld-secured to fixing members 32 by YAG laser and the assembly is contained in a frame 30.

When the film 3 is formed on the end face 2 of the bare fiber 1 after the bare fiber 1 was inserted into and secured to the ferrule 4, the evaporation atoms or molecules of the film forming material can be adhered to the side surface of the ferrule 4, with the result that the ferrule 4 may not be weld-secured to the fixing members 32 by the YAG laser thereby not to achieve adequate fixing strength. However, according to the optical device manufacturing method of the present invention in which the bare fiber 1 is inserted into and secured to the ferrule 4 after the film 3 was formed on the end face 2 of the bare fiber 1, there is no danger of adhering the evaporation atoms or molecules of the film forming material onto to the side surface of the ferrule 4. Accordingly, the welding between the optical device 6 (ferrule 4) and the fixing members 32 effected by the YAG laser is not prevented by the evaporation atoms or molecules of the film forming material adhered to the side surface of the ferrule 4, thereby providing the adequate fixing strength. As a result, after the optical device 6 is secured to the fixing members 32, even when the ferrule 4 is moved around fixed point 34 to perform the optical alignment between LD 8 and the bare fiber 1, there is no occurrence of cracks in the fixed points 34. Incidentally, in the actual formation of module, the positioning is effected by securing the aligned optical device 6 to another fixing member (not shown). Further, when the optical device 6 (more specifically, the ferrule 4) is weld-secured to the fixing members 32 by the YAG laser, the solder 9 may be re-fused to deviate the bare fiber 1. Accordingly, in order to prevent such inconvenience, as shown in FIG. 4, it is desirable that an outer diameter of a distal end portion of the ferrule 4 is made greater than an outer diameter of the remaining portion to increase heat capacity. Incidentally, the module shown in FIG. 6 is a laser module used as a communication optical source or a pump source of an optical amplifier, and, in such a module, the optical device 6 serves to introduce the laser beam emitted from the LD 8 into the optical fiber with low reflection.

Second Embodiment

In the first embodiment, while an example that the anti-reflection film is formed on the end face of the bare fiber was explained, according to the optical device manufacturing method of the present invention, an optical device in which a film such as SWPF (short wavelength pass filter), LWPF (long wavelength pass filter) or band pass filter is formed can be manufactured, and, in any cases, a thickness of such a film can be made to a desired design value. Further, the optical device in which the film such as SWPF, LWPF or band pass filter is formed on the end face of the bare fiber is included in the optical device of the present invention.

In the first embodiment, while an example that the end face of the bare fiber is exposed within the vacuum chamber and the atoms or molecules of the film forming material are adhered to the end face was explained, according to the optical device manufacturing method of the present invention, substance formed by chemical reaction between the evaporation atoms or molecules of the film forming material and gas in the vacuum chamber can be deposited. Further, an optical device in which the substance formed by chemical reaction between the evaporation atoms or molecules of the film forming material and gas in the vacuum chamber is deposited onto the end face of the bare fiber is also included in the optical device of the present invention.

As a method for forming the film on the end face of the bare fiber, various PVD methods (ion assist method, ion plating method, ion beam sputtering method, magnetron sputtering method, MBE method) or various CVD method (ECR plasma CVD method, MOCVD method) may be used. Incidentally, PVD is physical vapor deposition, MBE is molecular beam epitaxy, CVD is chemical vapor deposition, ECR is electron cyclotron resonance, and MOCVD is metal organic chemical vapor deposition.

Effects of Invention

In the optical device manufacturing method of the present invention, since the bare fiber is inserted into and secured to the ferrule after the film is formed on the end face of the bare fiber, one or more of the following effects can be obtained:

(1) When the film is formed on the end face of the bare fiber, there is no inconvenience caused by the fact that the evaporation atoms or molecules of the film forming material strike against the evaporation atoms or molecules rebounded from the end face of the ferrule thereby to prevent formation of adequate lamination of layers on the end face of the bare fiber. Accordingly, the film having the thickness having the design value can positively be formed, and the optical device having the desired optical property can be manufactured easily and positively.

(2) The evaporation atoms or molecules of the film forming material do not adhere to the ferrule. Accordingly, when the optical device 6 manufactured by the optical device manufacturing method of the present invention is formed as the module, if the ferrule is required to be weld-secured to any structure by the YAG laser, the welding is not prevented by the evaporation atoms or molecules of the film forming material adhered to the ferrule, thereby achieving adequate fixing strength.

(3) Since the evaporation atoms or molecules directing toward the end face of the bare fiber do not strike against the evaporation atoms or molecules rebounded from the end face of the ferrule, the distance between the end face of the ferrule and the end face of the bare fiber protruded from the ferrule can be reduced as small as possible. Accordingly, the deviation amount between the center of the bare fiber protruded from the end face of the ferrule and the center of the ferrule can be reduced, and, thus, the optical device permitting easy formation of module can be manufactured. For example, when the manufactured optical device is formed as the module as shown in FIG. 6, the optical alignment between the bare fiber and the LD is improved, thereby suppressing the fluctuation of the coupling efficiency within the allowable range.

(4) When it is assumed that the distance between the end face of the ferrule and the end face of the bare fiber protruded from the ferrule is L and the outer diameter of the bare fiber having the side surface on which the metal film was formed is d, since the bare fiber is inserted into and secured to the ferrule to satisfy the relationship $L < 4 \times d$, in the manufactured optical device, the deviation amount between the center of the end face of the bare fiber protruded from the ferrule and the center of the ferrule can be reduced as small as possible. Accordingly, the optical device permitting easy formation of module can be manufactured.

The optical device of the present invention can achieve one or more of the following effects:

(1) When it is assumed that the distance between the end face of the ferrule and the end face of the bare fiber protruded from the ferrule is L and the outer diameter of the bare fiber having the side surface on which the metal film was formed is d, since the relationship $L < 4 \times d$ is satisfied, the deviation amount between the center of the end face of the bare fiber protruded from the ferrule and the center of the ferrule is small. Accordingly, the optical device permitting easy formation of module can be obtained. For example, when manufacturing the module as shown in FIG. 6, the optical alignment between the bare fiber and the LD is improved, thereby suppressing the fluctuation of the coupling efficiency within the allowable range.

(2) In the case where the outer diameter of the distal end portion of the ferrule is made greater than the outer diameter of the remaining portion, since the heat capacity of the distal end portion is increased, when the optical device is welded to any structure by the YAG laser, the solder between the ferrule and the bare fiber is not re-fused, and, thus, the position of the bare fiber is not deviated.

What is claimed is:

1. An optical device manufacturing method comprising the steps of:

forming a film on an end face of a bare fiber; and thereafter, inserting said film-formed into a ferrule in such a manner that the end face of said film-formed fiber is protruded from an end face of said ferrule, and securing said film-formed fiber to said ferrule.

2. An optical device manufacturing method according to claim 1, further comprising the step of:

forming a metal film on a side surface of a longitudinal end portion of said bare fiber by plating, deposition, sputtering or the like.

3. An optical device manufacturing method according to claim 1, further comprising the step of:

inserting said film-formed fiber into said ferrule and securing said film-formed fiber to said ferrule in such a manner that, when it is assumed that a distance between the end face of said ferrule and the end face of said film-formed fiber protruded from said ferrule is L and an outer diameter of said bare fiber is d, a relationship $L < 4 \times d$ is satisfied.

4. An optical device manufacturing method according to claim 1, further comprising the step of:

inserting said film-formed fiber into said ferrule and securing said film-formed fiber to said ferrule in such a manner that, when it is assumed that a distance between the end face of said ferrule and the end face of said film-formed fiber protruded from said ferrule is L, a relationship $L < 0.5$ mm is satisfied.

5. An optical device manufacturing method according to claim 1, further comprising the step of:

forming the end face of said film-formed fiber in a lens configuration.

6. An optical device manufacturing method according to claim 1, further comprising the step of:

weld-fixing said ferrule to a fixing member in such a manner that the end face of said film-formed fiber is opposed to an LD, thereby forming a fixed point.

7. An optical device manufacturing method according to claim 6, further comprising the step of:

moving a ferrule around said fixed point to perform the optical alignment between a film-formed fiber and LD.

8. An optical device manufacturing method according to claim 1, further comprising the step of: illuminating active molecules onto the film when said film is formed on the end face of said bare fiber.

9. An optical device comprising:

a film-formed fiber having an end face on which a film was formed; and a ferrule into which said film-formed fiber was inserted and to which said film-formed fiber was secured; and wherein when it is assumed that a distance between the end face of said film-formed fiber and an end face of said ferrule is L and an outer diameter of said film-formed fiber is d, a relationship L<4×d is satisfied.

10. An optical device according to claim 9, wherein a relationship L<0.5 mm is satisfied.

11. An optical device according to claim 9, wherein an outer diameter of a distal end portion of said ferrule is greater than an outer diameter of the remaining portion.

12. An optical device according to claim 9, further comprising an LD opposed to the end face of said film-formed fiber in an aligned condition.

13. An optical device according to claim 12, further comprising a fixing member weld-secured to said ferrule.

14. An optical device according to claim 13, further comprising a frame containing said LD, said film-formed fiber, said ferrule and said fixing member.

15. An optical device according to claim 9, further comprising a metal film formed on a side surface of said film-formed fiber.

16. An optical device according to claim 9, wherein said film-formed fiber is secured to said ferrule by solder.

* * * * *